No. 893,792. PATENTED JULY 21, 1908.
W. C. GABRIEL.
REINFORCEMENT FOR CONCRETE OR CEMENT CONSTRUCTION.
APPLICATION FILED MAY 4, 1907.
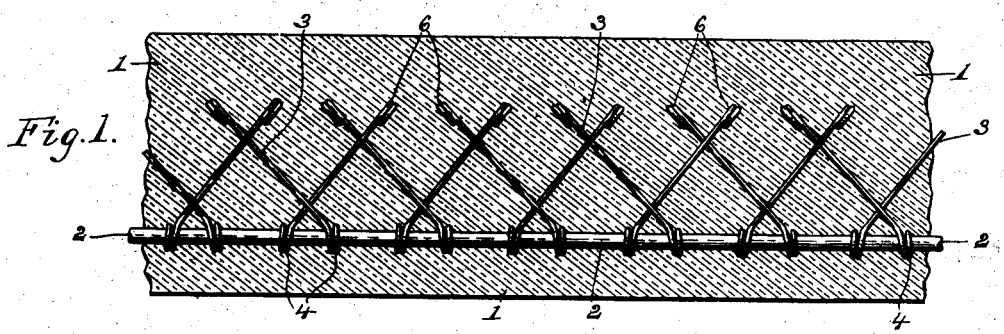
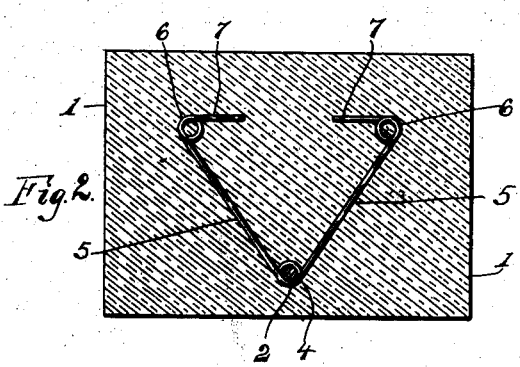
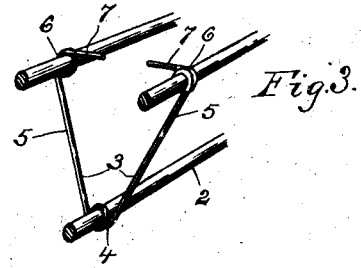
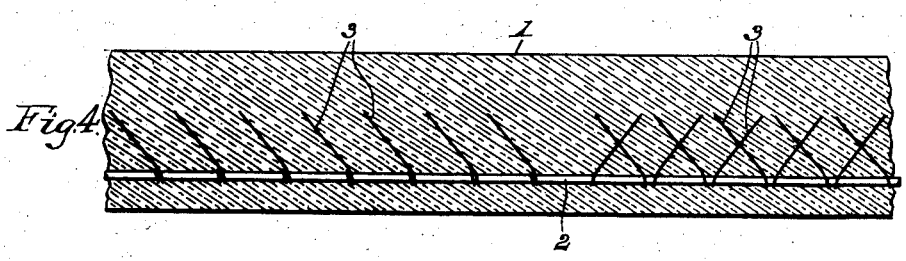
WITNESSES: INVENTOR
William C. Gabriel
BY
Attorneys.

UNITED STATES PATENT OFFICE.

WILLIAM C. GABRIEL, OF AUBURN, INDIANA.

REINFORCEMENT FOR CONCRETE OR CEMENT CONSTRUCTION.

No. 893,792.　　　　　Specification of Letters Patent.　　　Patented July 21, 1908.

Application filed May 4, 1907. Serial No. 371,787.

*To all whom it may concern:*

Be it known that I, WILLIAM C. GABRIEL, a citizen of the United States of America, residing at Auburn, in the county of Dekalb and State of Indiana, have invented certain new and useful Improvements in Reinforcements for Concrete or Cement Construction, of which the following is a specification, reference being had therein to the accompanying drawings.

In reinforced concrete work, economy of construction requires that the tensile and shear sustaining members be distributed in proportion to the load to be resisted, and that they be of common commercial form, so as to be obtainable without the use of special machinery.

This invention relates to a form of reinforced concrete work wherein the tensile and shear members are made of common or stock material, formed into usable shape at the place where needed, and thus inexpensive and readily obtainable.

The invention consists in the matters hereinafter set forth, and more particularly pointed out in the appended claims.

Referring to the drawings, Figure 1 is a view in longitudinal section through a composite beam of concrete and metal which embodies the features of the invention. Fig. 2 is a view in cross-section through the beam. Fig. 3 is a perspective view in detail of one of the shear members showing how three longitudinal members may be used. Fig. 4 is a diagrammatic view, one half showing a distribution of shear member for steady load, and the other half showing the arrangement for a rolling load.

In the drawings, 1 represents the body of the beam which is of cement or the like, molded of the desired dimensions. A metal tension member 2 is embedded longitudinally in the beam near its lower side. This is preferably a cylindrical rod, or pipe, of suitable dimension.

A plurality of metal shear members 3 are secured on the rod. These each consist of a piece of wire bent upon itself between its ends with a complete turn, into a closed loop or eyelet 4 which is adapted to closely encircle the rod or tension member, with its arms 5 projecting divergently upward at approximately right angles to each other. Near their upper ends, each of the arms is turned upon itself in the form of a closed circular loop 6 and the portion 7 beyond the loop is extended inwardly in practically a horizontal plane.

In making the beam, a sufficient number of the shear members required for withstanding the intended load, are formed up of wire lengths and slipped or otherwise formed upon the rod, or tensile member, and are distributed along the member at distances proportioned to the load or shear distribution. They are tilted so that the planes of the arms are oblique to the rod axis and thus transverse to the shear strains. When the beam is to be supported at either end under steady load, the shear members are symmetrically disposed on either side of the center in divergent planes as shown in the left half of the diagrammatic figure. When the load is moving or when the shear strains may change their direction, the shear members are disposed as opposite diagonals, as in the right half of the diagrammatic figure. Obviously, they may be set close enough together so as to cross or interlace, and may be distributed at any intervals desired. In as much as the central loops are formed to closely fit the tensile rod when the arms are vertical thereto, tilting them over into oblique planes causes the loops to grip the tension member and transmit the strain directly thereto. Furthermore, as the wire is given a complete turn around the rod the arms transmit in a straight line, and tend to pull the loop or eyelet more closely or to tighten it, and not to straighten out. The inclined arms likewise carry some of the shear tension out of the upper compression layer of the concrete and so aid in resisting flexure.

The parts may be shipped as straight blanks to the place of construction and thus readily formed up and applied with a minimum expense of shipping and making.

If desired three longitudinal members 2 may be used as shown in Figure 3.

I claim as my invention:—

The combination with a concrete mass of a composite beam, of a longitudinal metal tension member embedded therein parallel to and near its lower side and centrally thereof, and a plurality of shear members each consisting of a length of wire bent at its center with a full turn into a closed loop encircling the tension member, its upwardly extending divergent arms being each bent near their ends into a closed eyelet with an inwardly projecting horizontal arm parallel to the tension member, and a pair of anchor rods extending through the eyelet of said shear members, the arms of said shear members being bent at the loop into a plane oblique to the plane of the loop and being disposed in definite spaced relation in such oblique planes substantially perpendicular to the lines of the shear stresses of the mass of the beam and said anchor rods lying parallel to and close to the upper face of the beam.

In testimony whereof I affix my signature in presence of two witnesses.

WILLIAM C. GABRIEL.

Witnesses:
 OTTO F. BARTHEL,
 ANNA M. DORR.